US012496885B2

(12) United States Patent
Facchinello et al.

(10) Patent No.: US 12,496,885 B2
(45) Date of Patent: Dec. 16, 2025

(54) MODULAR TRUCK CAP APPARATUS

(71) Applicant: Extang Corporation, Ann Arbor, MI (US)

(72) Inventors: Jerome Facchinello, Grand Blanc, MI (US); Robert Mosingo, Saline, MI (US); Chad Carter, Manchester, MI (US); Anthony Becker, Saline, MI (US); Robert Wisely, Saline, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 18/673,377

(22) Filed: May 24, 2024

(65) Prior Publication Data

US 2024/0308313 A1    Sep. 19, 2024

Related U.S. Application Data

(63) Continuation of application No. 17/749,210, filed on May 20, 2022, now Pat. No. 12,017,519.

(51) Int. Cl.
*B60J 7/10* (2006.01)
*B60J 7/16* (2006.01)

(52) U.S. Cl.
CPC .............. *B60J 7/1614* (2013.01); *B60J 7/106* (2013.01)

(58) Field of Classification Search
CPC . B60J 7/106; B60J 7/1607; B60J 7/104; B60J 7/11; B60J 7/141; B60J 7/102; B60J 7/194; B60J 7/185; B60J 7/19; B60J 1/006; B60J 1/085; B62D 33/04; B62D 33/046; F16B 21/06–088

USPC .......... 296/100.02, 121, 100.17, 218, 165, 3
See application file for complete search history.

(56) References Cited

U.S. PATENT DOCUMENTS

| 2,893,780 | A |   | 7/1959  | Ervine |         |
|-----------|---|---|---------|--------|---------|
| 3,021,170 | A |   | 2/1962  | Cornelius | |
| 3,050,335 | A | * | 8/1962  | Schubach | B62D 33/04 |
|           |   |   |         |        | 296/213 |
| 3,819,223 | A |   | 6/1974  | Cobb et al. | |
| 4,095,841 | A | * | 6/1978  | Thompson | B60J 7/106 |
|           |   |   |         |        | 296/218 |
| 4,448,453 | A |   | 5/1984  | Irelan et al. | |
| 4,738,274 | A | * | 4/1988  | Heath  | B60P 7/02 |
|           |   |   |         |        | 296/156 |
| 5,056,855 | A | * | 10/1991 | Moravsky | B60J 7/104 |
|           |   |   |         |        | 296/105 |

(Continued)

FOREIGN PATENT DOCUMENTS

| GB | 2603425 A  | * | 8/2022 | ............. | B60J 7/062 |
| WO | WO-2016037215 A1 | * | 3/2016 | ............. | B60R 9/04 |

*Primary Examiner* — Amy R Weisberg
*Assistant Examiner* — Wenwei Zhuo (57) ABSTRACT

An apparatus for covering at least a portion of a cargo area of a vehicle, the apparatus includes a frame; one or more side panels attached to the frame; one or more quarter panels attached to the frame; a rear panel; a roof panel supported by the frame; and a lifting mechanism configured to reposition the roof panel relative to the frame and/or the one or more side panels. The lifting mechanism has a handle, a lifter, and a track supporting the lifter. Movement of the handle causes the track to move in a first direction, which causes the lifter to slide in the track in a second direction to raise and/or lower the lifter, which causes the roof panel to be moved or repositioned.

13 Claims, 8 Drawing Sheets

(56) References Cited

U.S. PATENT DOCUMENTS

| | | | |
|---|---|---|---|
| 5,344,159 A | 9/1994 | Powell | |
| 5,423,587 A * | 6/1995 | Ingram | B60P 3/42 |
| | | | 135/88.13 |
| 6,086,134 A | 7/2000 | Cravens | |
| 9,440,520 B2 | 9/2016 | Rohr et al. | |
| 9,776,485 B2 * | 10/2017 | Singer | B60J 7/1607 |
| 10,272,754 B2 | 4/2019 | Johnson | |
| 10,746,218 B2 * | 8/2020 | Huet | F16B 21/086 |
| 10,760,295 B2 | 9/2020 | Attema | |
| 11,376,932 B2 * | 7/2022 | Barnwell | B60J 10/90 |
| 2002/0167190 A1 * | 11/2002 | McElwee | B62D 33/0621 |
| | | | 296/77.1 |
| 2003/0085586 A1 * | 5/2003 | Kiousis | B60J 7/106 |
| | | | 296/102 |
| 2003/0145437 A1 * | 8/2003 | Medgyes | F16B 21/086 |
| | | | 411/340 |
| 2009/0102227 A1 | 4/2009 | Herndon | |
| 2010/0201154 A1 | 8/2010 | Kramer | |
| 2017/0349032 A1 | 12/2017 | Lewis | |
| 2019/0249473 A1 * | 8/2019 | Damboiu | B60J 1/085 |
| 2020/0031211 A1 * | 1/2020 | Singer | B60J 10/45 |
| 2021/0114445 A1 * | 4/2021 | Deckard | B60J 7/1614 |
| 2022/0186765 A1 * | 6/2022 | Raine | F16B 21/076 |
| 2023/0028850 A1 | 1/2023 | Young | |

* cited by examiner

MODULAR TRUCK CAP APPARATUS

FIELD

These teachings relate to a vehicle cover, and more specifically to an apparatus having a frame onto which one or more panels can be attached and detached.

BACKGROUND

A truck cap may be used to cover the cargo area of a pickup truck to prevent fluids and/or debris from entering the cargo area. Some traditional truck caps are difficult to install and uninstall from a pickup truck. Some traditional truck caps are bulky and expensive to ship and occupy a lot of space in storage. Some traditional truck caps limit the amount and/or size of goods that may be stored and/or transported in the cargo area of a vehicle. Accordingly, it may be desirable to have an apparatus that may overcome at least some of these deficiencies.

For example, it may be desirable to have a truck cap that can be quickly and easily installed on and uninstalled from a vehicle. It may be desirable to have a truck cap that can be shipped in one or more boxes and/or easily stored when not in use. It may be desirable to have a truck cap that has one or more panels that can be removed from a frame, to allow for larger or additional goods to be stored or transported in the cargo area of the vehicle. It may be desirable to have a truck cap having one or more panels that can be quickly installed onto a frame, to quickly and easily enclose a cargo area of the vehicle to present fluids and/or debris from entering the cargo area. It may be desirable to have a truck cap with one or more panels that can be quickly removed from a frame, to provide an open-air truck cap and/or so that other items, such as tools or accessories, can be mounted or attached to the frame.

SUMMARY

These teachings provide a truck cap. The apparatus or truck cap can be quickly and easily assembled and/or installed on a vehicle. The apparatus or truck cap can be quickly and easily disassembled and/or uninstalled on a vehicle. The apparatus or truck cap that can be shipped in one or more boxes and/or easily stored when not in use. The apparatus or truck cap has one or more panels that can be removed from a frame, to allow for larger or additional goods to be stored or transported in the cargo area of the vehicle. The apparatus or truck cap has one or more panels that can be quickly installed onto a frame, to enclose a cargo area of the vehicle to quickly and easily to prevent fluids and/or debris from entering the cargo area. The apparatus or truck cap has one or more panels that can be quickly removed from a frame, to provide an open-air truck cap. Open air truck cap means that the interior of the cargo area is exposed to the environment. By removing one or more panels from the frame, other items, such as tools, shovels, gas cans, jacks, tires, ladders, or other accessories, can be mounted or attached to the frame.

An apparatus for covering at least a portion of a cargo area of a vehicle is provided. The apparatus includes a frame; one or more side panels attached to the frame; one or more quarter panels attached to the frame; a rear panel; a roof panel supported by the frame; and a lifting mechanism configured to reposition the roof panel relative to the frame and/or the one or more side panels. The lifting mechanism has a handle, a rotary part connected to the handle, a lifter, and a track supporting the lifter. Movement of the handle causes the track to move in a first direction, which causes the lifter to slide in the track in a second direction to raise and/or lower the lifter, which causes the roof panel to be repositioned.

DETAILED DESCRIPTION

Figure 1:
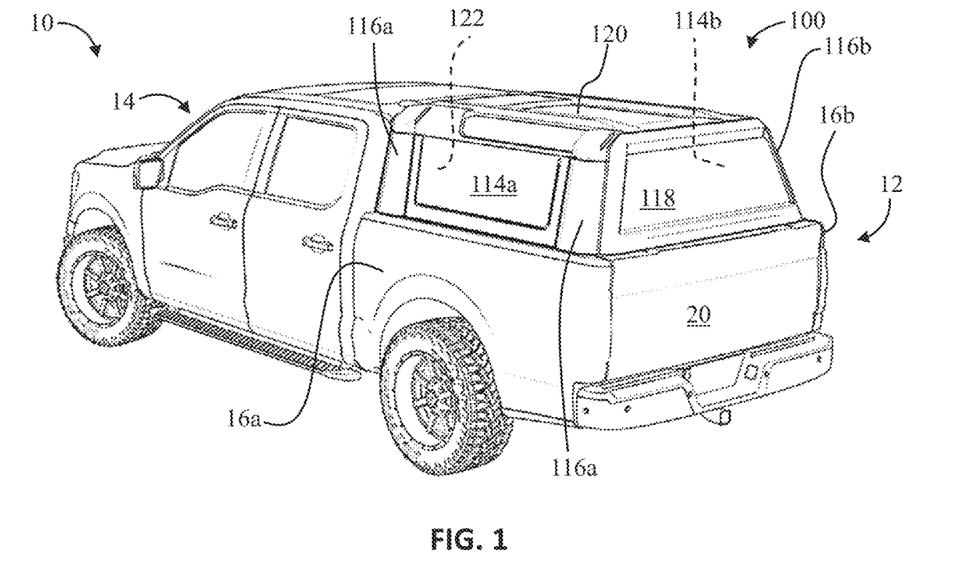
FIG. 1 is a perspective view of a vehicle and the apparatus according to these teachings, which includes a frame and one or more panels attached to the frame.
Figure 2:
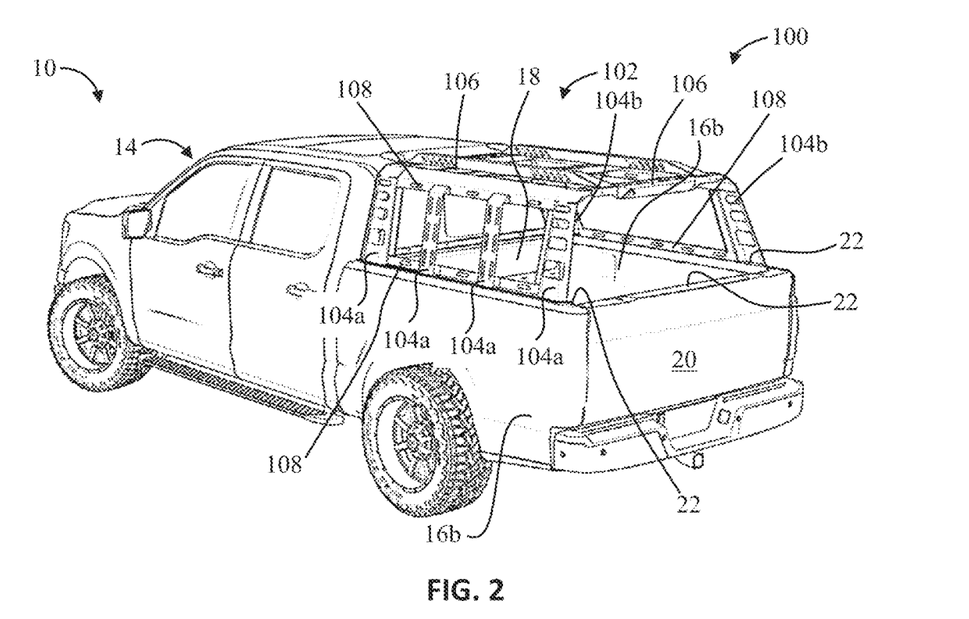
FIG. 2 is a perspective view of a vehicle and the frame of the apparatus.

A vehicle 10 is illustrated in FIGS. 1 and 2. The illustrated vehicle 10 is a pickup truck. However, the vehicle 10 may be any vehicle 10 that has a bed or cargo area 12. The vehicle 10 a passenger area or cab 14, which may include one or more seats for one or more occupants to sit in while operating the vehicle 10.

The cargo area 12 may be defined by a plurality of walls that include: opposing side walls 16a, 16b, a front wall 18 located adjacent the passenger cab 14, and a rear wall or tailgate 20 that opposes the front wall 18. Each of the walls 16a, 16b, 18, 20 may include a top surface 22 and inwardly facing inside surfaces defining the inside of the cargo area 12. The cargo area 12 has a bottom or floor that is surrounded by the walls 16a, 16b, 18, 20. The bottom or floor is opposite the open end or top of the cargo area 12.

The front wall 18 of the cargo area 12 may be a shared or common wall with a rear wall of the passenger cab 14. Such vehicles may be a one piece or a uni-body vehicle. In other vehicles, the front wall 18 may be a separate wall, segment, or portion of the vehicle from a rear wall of the passenger cab 14. The front wall 18 may also provide access to the passenger cab 14 via a pass through or fold down wall or door.

An apparatus 100 is illustrated in FIGS. 1 and 2. The apparatus 100 may be for at least partially covering a portion of the cargo area 12 of the vehicle 10. The apparatus 100 may be, or may be referred to herein as, a cap, a truck cap, a modular truck cap, an overland cap, an overland cover, an overland knock-down truck cap, a rack, a frame, an assembly, or the like.

The apparatus 100 comprises a frame 102. The frame 102 may be attached to, or supported at, on, or by one or more of the walls 16a, 16b, 18, 20 of the vehicle 10 (i.e., on the top surface 22 of one or more of the walls and/or on the inside surface of one or more of the walls and/or on the bottom or floor of the cargo area 12).

In the illustrated example, the frame 102 is attached to or supported at, on, or by the side walls 16a, 16b and optionally the front wall 18. It may be advantageous to not attach or support the apparatus 100 to or on the rear wall or tailgate 20 of the vehicle 10, to not obstruct, hinder or restrict operation of the tailgate 20 while the apparatus 100 is installed on the vehicle 10. However, in certain configurations, the frame 102 or one or more element of the frame 102 may be attached to or supported at, on, or by the tailgate 20.

The frame 102 may be secured to the one or more walls of the vehicle via one or more fasteners or clamps. For example, the one or more fasteners or clamps may be similar to those traditionally used to secure a truck cap to a vehicle and/or a rail to the bed wall of a vehicle for supporting a tonneau cover.

Referring now to FIGS. 2, 3, 4, and 5, the frame 102 of the apparatus 100 comprises one or more pillars 104a, 104b. A pillar may also be referred to herein as a pillar bar. A pillar 104a, 104b may be a generally vertical element or support component of the frame 102. Pillars 104a are arranged on the driver's side of the vehicle 10 and pillars 104b are arranged on the passenger side of the vehicle 10. The apparatus 100 may have the same number of pillars 104a, 104b on each side of the vehicle 10 or cargo area 12, or there may be a different number of pillars 104a, 104b on each side of the vehicle 10 or cargo area 12. Pillars 104a, 104b that are located on the same side of the vehicle 10 or cargo area 12 may be referred to herein as adjacent pillars. Pillars 104a, 104b that oppose one another or are located on opposite sides of the vehicle 10 or cargo area 12 may be referred to herein as opposing pillars.

Pillars 104a, 104b may be attached to and/or supported at, on, or by the top surface 22 of the walls 16a,b, 18, and optionally tailgate 20. Additionally, or alternatively, the pillars 104a, 104b may be attached to and/or supported at, on, or by the inside surfaces of the walls 16a,b, 18, and optionally tailgate 20. The pillars 104a, 104b may be attached to the one or more walls 16a, 16b, 18, and 20 via one or more fasteners (screws, bolts, etc.) or clamps, such as those commonly used to secure tonneau cover bed rails and/or truck toppers to a cargo area 12 and/or vehicle 10. In some configurations, a horizontal rail may be attached to one or more walls of the cargo area and the one or more pillars 104a, 104b may be attached to those rails.

The frame 102 may include one or more first supports 106. The one or more supports disclosed herein (first supports, second supports, third supports, etc.) may also be referred to herein as a support bar or support bars. First supports 106 may be also referred to as lateral or horizontal supports. A first support 106 may be a generally horizontal element or support component of the frame 102. The first supports 106 or lateral supports may extend in a cross-car direction and/or between opposing pillars 104a and 104b. The first supports 106 may be attached to and/or supported at, on, or by pillars 104a, 104b via one or more fasteners (screws, bolts), clamps, etc. The first supports 106 may be attached to and/or supported at, on, or by one or more of the walls of the cargo area 12, by the top surface and/or inner surface thereof. In some configurations, a horizontal rail may be attached to one or more walls of the cargo area and the one or more supports 106 may be attached to those rails. As shown best in FIGS. 5 and 9, one or more of the first or lateral supports 106 may have a downwardly turned flange portion 107 and/or an upwardly turned flange portion 107'. The flange portions 107, 107' may assist with attaching, clamping, and/or supporting the frame 102 or supports 106 to the cargo area 12 or vehicle, for example to the inside walls of the cargo area and/or the top sides or surfaces of the side walls of the cargo area of the vehicle.

Figure 3:
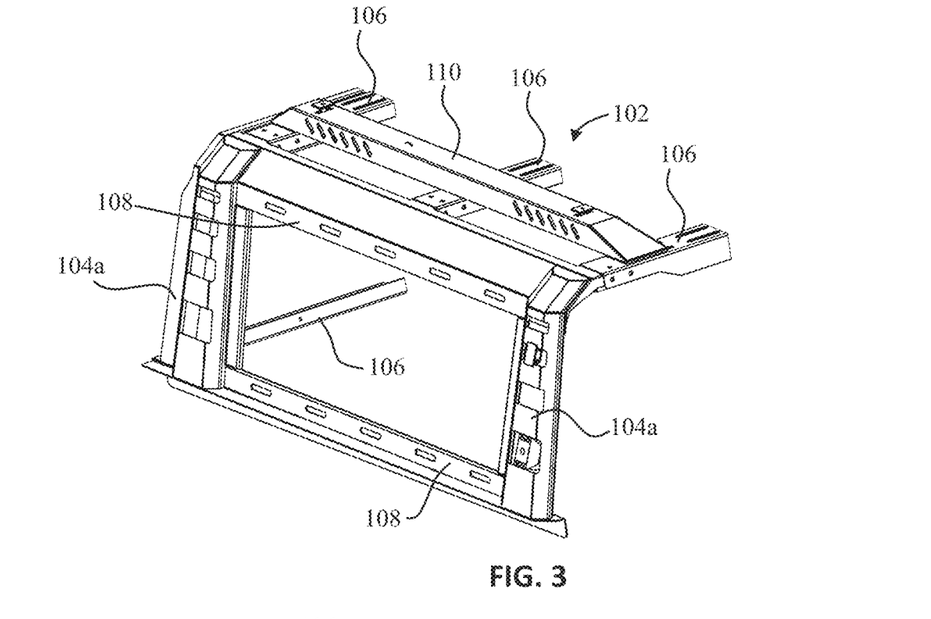
FIG. 3 is a partial perspective view of the frame.
Figure 4:
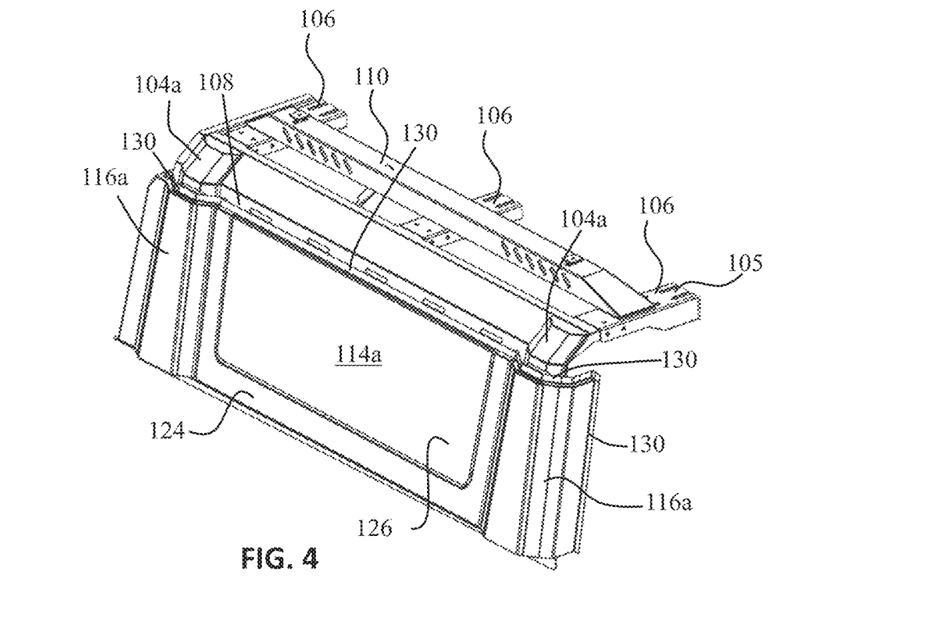
FIG. 4 is a partial perspective view of the frame and panels attached to the frame.
Figure 5:
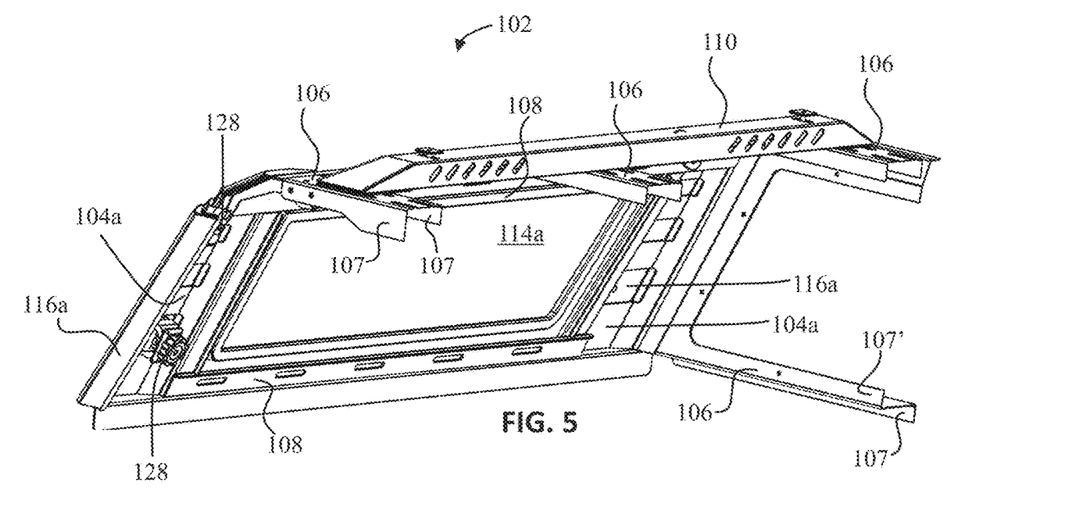
FIG. 5 is a partial perspective view of the frame and panels attached to the frame.

The frame 102 may include one or more second supports 108. Second supports 108 may be also referred to as longitudinal supports. A second support 108 may be a generally horizontal element or support component of the frame 102. The second supports 108 or longitudinal supports 108 may extend in a fore-aft direction between adjacent pillars 104a, 104a or between adjacent pillars 104a, 104b. The second supports 108 are also illustrated in FIGS. 3, 4, 5. The second supports 108 may be attached to and/or supported at, on, or by pillars 104a, 104b via one or more fasteners. The second supports 108 may be secured to the one or more side walls 16a, 16b via one or more fasteners (bolts, screws) or clamps, such as those commonly used to secure tonneau covers and/or truck toppers to a cargo area 12 and/or vehicle 10.

The frame 102 may include one or more third supports 110. Third supports 110 may be referred to as longitudinal supports or roof supports. A third support 110 may be a generally horizontal element or support component of the frame 102. The third supports 110 or longitudinal supports may extend in a fore-aft direction. The third supports 110 are also illustrated in FIGS. 3, 4, 5. The third supports 110 may be attached to and/or supported at, on, or by first supports 106 via one or more fasteners. The third supports 110 may be attached to top surfaces 105 of the first supports 106. However, in some configurations, the third supports 110 may be attached to the opposing bottom surfaces of the first supports 106 or to a region between the top and bottom of the first supports 106.

While the aforementioned description of the frame 102 suggests the pillars and supports are generally linear elements that extend in either a cross-car direction or a fore-aft direction, it is understood that one or more elements of the frame 102, the pillars, or the supports, may extend at an angle or may even have a curved extension. For example, a support may extend at an angle between an upper left corner of the frame 102 to a lower left corner of the frame 102, between an upper right corner of the frame 102 to a lower right corner of the frame 102; from a front right corner of the frame 102 to a rear left corner of the frame 102; etc. Such angled supports or pillars may provide additional strength/structure to the frame 102, styling aesthetics, and/or functional attachment points for attaching panels 112, accessories, and/or equipment. That is, the elements or members of the frame 102 may be used to attach or support various accessories, such as a ladder, spare tire, fire extinguisher, gas cans, tools, firearms, sporting equipment, and the like. The frame 102 may also be used for attaching, securing, and/or supporting one or more panels 112 to the apparatus 100.

Referring to FIGS. 1 and 4, the apparatus may include one or more panels 112. The one or more panels 112 may be supported at, on, or by, or may be attached to the frame 102 or to one or more pillars, supports, or elements of the frame 102. Additionally, or alternatively, the one or more panels 112 may be supported at, on, or by, or may be attached to one or more walls defining the cargo area 12 of the vehicle 10. Additionally, or alternatively, the one or more panels 112 may be supported at, on, or by, or may be attached to one or more other panels 112 of the apparatus 100. The one or more panels 112 may be secured to one another and/or to the frame 102 via one or more fasteners (screws, bolts, clips, prongs, screws, rivets, barbs, quick connects, twist fasteners, magnets, etc.) and/or securing members discussed further below.

The panels 112 may include: opposing side panels 114a, 114b (driver side and passenger side respectively), one or more quarter panels 116a, 116b (front and rear, respectively), a rear panel 118, a top panel 120, and a front panel 122, which may be adjacent to the front wall 18 of the cargo area 12 and/or the passenger cab 14.

One or more of the panels 112 may be combined with one or more other panels 112 to form a single panel. For example, a quarter panel 116a may be combined with a side panel 114a; the top panel 120 may be combined with a side panel; the front panel may be combined with a top panel and/or quarter panel, etc. One or more of the panels 112 may be separated into two or more discrete panels. For example, the side panel 114a may be separated into a front side panel and a rear side panel, together defining the side panel 114a illustrated in the figures. For example, the side panel 114a may include a frame 124 and a window 126 that may be separated from one another; e.g., Sec FIG. 4). The window 126 may be moveable (slidable, tiltable, foldable, removable, to provide air or access to the inside of the cargo area. The one or more panels 112 may be made of a rigid material (i.e., plastic, carbon fiber, metal, aluminum, etc.). The one or more panels 112 may be made of or include a fabric, vinyl, plastic, or canvas material. The one or more panels 112 may be transparent or translucent. The one or more panels 112 may be solid and non-transparent or non-translucent. The one or more panels 112 may be painted to match the color of the vehicle 10. The one or more panels 112 may a different color than the vehicle.

The apparatus 100 may be modular. Modular means that the one or more panels 112 (i.e., panels 114a, 114b, 116a, 116b, 118, 120, 122) may be removably attached or supported at, on, or by other panels 112 and/or to the frame 102 and/or to one or more pillars or supports or elements of the frame 102. This means that one or more of the pillars 104a,b or supports 106, 108, 110 or elements of the frame 102 may be removably attached or supported at, on, or by other panels 112 and/or to one or more pillars or supports or elements of the frame 102. This may provide the user or owner of the apparatus 100 or vehicle 10 ability to customize the look, style, and/or functionality of the apparatus 100.

For example, a user may with to remove some or all of the panels 112 from the apparatus 100, to achieve an open cargo area, like the one illustrated in FIG. 2. Other users may with to attach all of the panels 112 to the frame 102 to achieve an enclosed cargo area 12 to keep fluids and/or debris from entering the cargo area 12, like the one illustrated in FIG. 1. In some configurations, a user may wish to remove some of the panels 112, such as the side and quarter panels, but keep other panels, such as the top roof panel 120. By removing some of the panels 112, certain elements of the frame 102 may be exposed, which may allow a user to attach or hang certain goods or accessories to the frame 102 or apparatus 100, such a kayak, lumber, a ladder, spare tire, fire extinguisher, gas can, tool, firearms, sporting equipment, and the like. One or more of the panels 112 may also have the ability, functionality, and/or structure to attach or hold one or more of the accessories goods directly to the panels 112 as well. The roof panel and/or the rear panel and/or the side panels may include features for holding or securing one or more goods. The interior of the one or more panels 112, pillars, supports, or elements of the frame may also be outfitted with means to support or hang the one or more aforementioned accessories or goods. For example, the one or more panels 112, pillars, supports, or elements of the frame may have one or more hooks, hangers, openings, clamps, clasps, chords, screws, bores, tie down locations, straps, magnets, for holding or securing the one or more aforementioned goods or accessories.

Figure 6A:
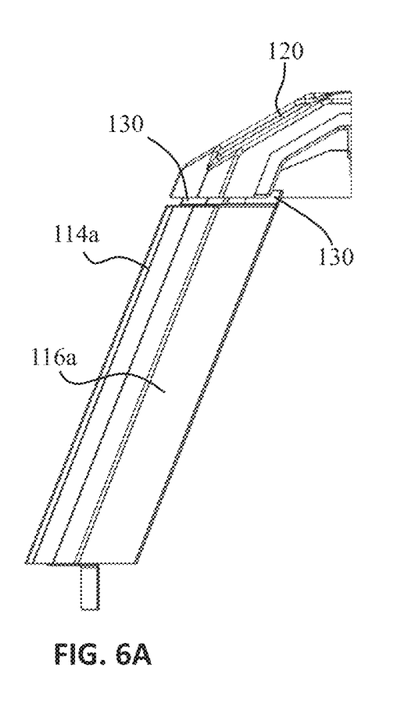
FIG. 6A is a partial side view the top panel and the quarter panel.
Figure 6B:
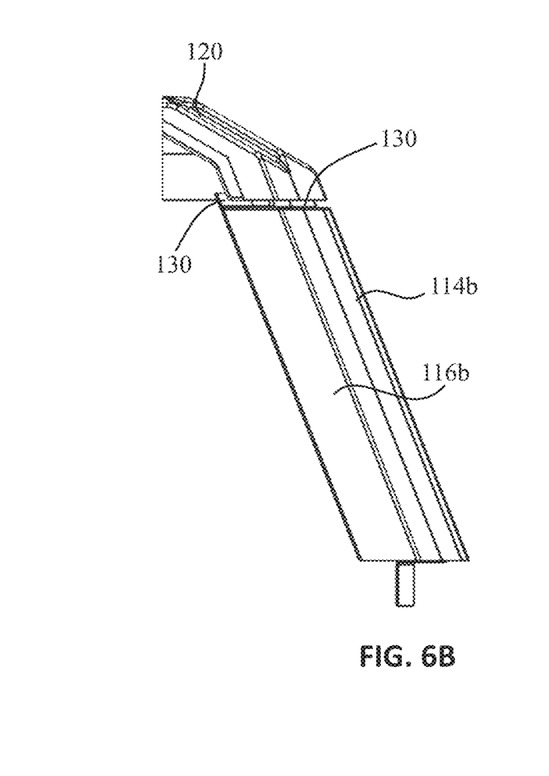
FIG. 6B is a partial side view the top panel and the quarter panel.

Referring to FIGS. 4, 6A and 6B, one or more of the panels 112 may include a lip 130. The lip 130 may be a portion of a panel 112 that is configured to be at least partially covered by or overlaid by another panel 112 or element of the apparatus 100. As perhaps best shown in FIGS. 6A, 6B, the lip 130 may have a thinner material cross section than the rest of the panel 112. However, in certain configurations, the lip 130 and the rest of the panel 112 may have the same cross section or thickness. The lip 130 may be in a different plane than an adjacent portion of the panel 112. In FIGS. 6A and 6B, the top or roof panel 120 shingles or overhangs the quarter panels 116a, 116b and/or side panels 114a, 114b or more specifically shingles or overhangs the lip 130 of the aforementioned panels.

The lip 130 may be an extension of a panel 112. The lip 130 may extend only partially, or entirely, around a perimeter of a panel 112. In some configurations, the lip 130 may extend in only areas where the lip 130 is covered by another panel 112. For example, referring to FIGS. 6A and 6B, the lip 130 of quarter panels 116a, 116b is covered by the top panel 120. The top panel 120 may also be referred to herein as a roof panel. The quarter panels 116a, 116b may also have a lip in the region where the quarter panel 116a, 116b meets the side panel 114a,b, or vice versa (i.e., the side panels 114a, 114b may have a lip 130 that is covered by or overhung by the quarter panel 116a, 116b). Covering the lip 130 by an adjacent panel or element of the frame may restrict or prevent fluid and/or debris from flowing or getting behind the panel 112 and/or into the cargo area 12. The lip 130 may also reduce, eliminate, or close out gaps between adjacent panels 112, which may increase or improve aesthetic look of the apparatus 100.

In some configurations, the lip 130 may be or may include a gasket, seal, and/or compressible member to restrict or prevent wind, fluid, and/or debris from getting behind a panel 112/or into the cargo area 12. Such a lip configuration may advantageously reduce noise and vibrations that may occur when two panels 112 are in close contact with one another, that may be generated during vehicle operation.

The lip 130 may also be used to secure or connect one or more panels together and/or to the frame. For example, the lip 130 may include one or more openings or bores for a fastener to pass through to secure the panel 130 to another panel and/or to the frame or element of the frame. For example, the lip may include a hook and loop fastener, a double-sided tape, a pressure sensitive tape, etc. for securing adjacent panels to one another and/or to the frame.

Figure 7:
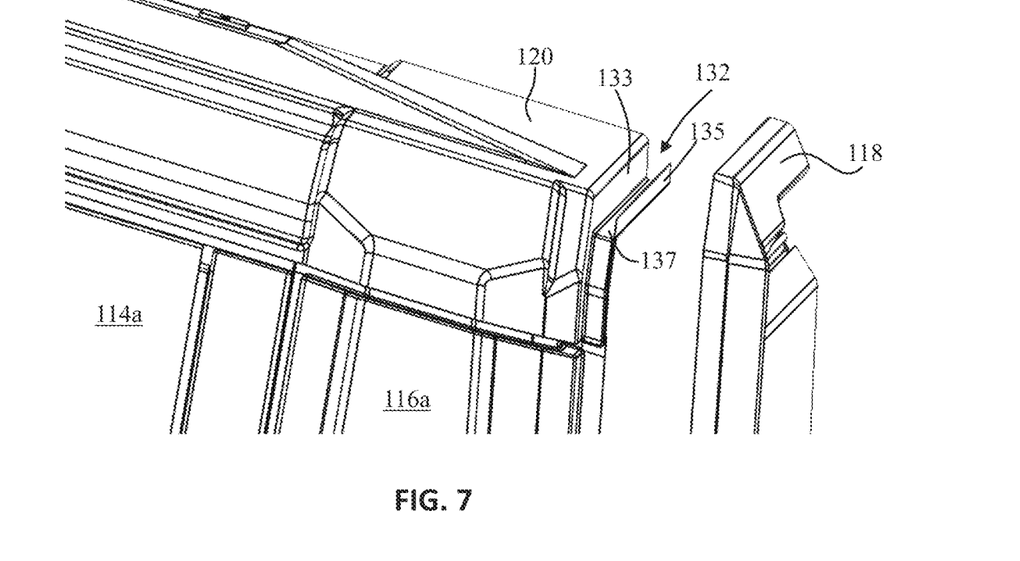
FIG. 7 is a partially exploded, perspective view showing the top panel, side panel, quarter panel, and rear panel.
Figure 8:
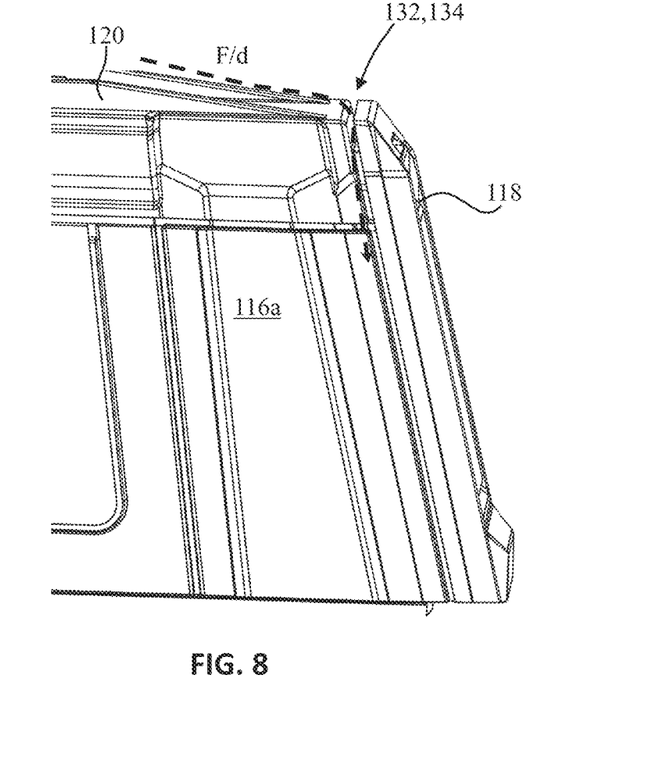
FIG. 8 is a partial perspective view showing the top panel, side panel, quarter panel, and rear panel.

FIGS. 7 and 8 illustrate the top panel 120, side panel 114a, quarter panel 116a, and the rear panel 118. The top panel 120 includes a drain channel 132. The drain channel 132 may function to collect and then divert fluid and/or debris F/d. The drain channel 132 may collect fluid and/or debris F/d that may roll or flow off a rear end of the top panel 120. In other words, rather than rolling off the rear panel 120, fluid and/or debris may fall into the drain channel 132 and then egress from the drain channel 132 to a side of the apparatus 100 (driver or passenger side). After the rear panel 118 is installed onto the apparatus 100, the drain channel 132 may be at least partially covered by the rear panel 118. A gap or slot 134 may still available between the panels 118, 120 to collect fluid and/or debris F/d, as can be seen in FIG. 8. The drain channel 132 may comprise a U or V shaped channel or slot. The drain channel 132 may comprise a forward upright wall 133, a rearward upright wall 135, and a horizontal or sloped floor 137 in-between. One or more holes may be provided in the walls 133, 135 and/or floor 137 to egress fluid from the channel 132. One or more tubes or hoses may be attached to one or more of the aforementioned holes to direct fluid and/or debris away from the cargo area. The floor 137 may be part of a lip 130 discussed above.

Figure 9:
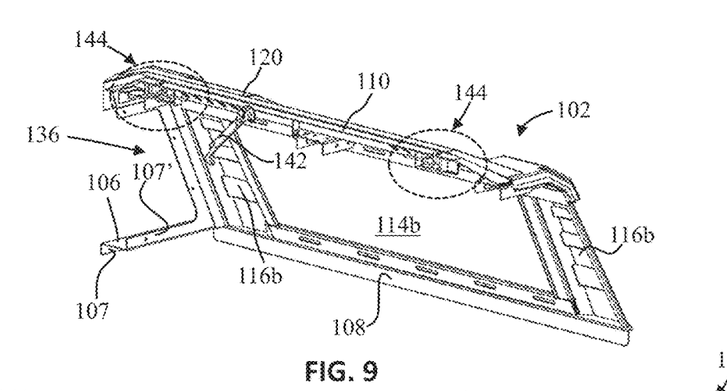
FIG. 9 is a partial perspective view of the frame.

FIG. 9 shows a section of the apparatus 100, when viewed from the inside. More specifically, a portion of the top panel 120, side panel 114b, and quarter panels 116b is illustrated. FIG. 9 also shows elements of the frame 102, discussed above. The apparatus 100 comprises a lifting mechanism 136. The lifting mechanism 136 may function to lift, move, lower, or otherwise reposition the top panel 120 relative to the frame 102, one or more panels 112 of the apparatus 102, or one or more elements of the apparatus 100.

Figure 10:
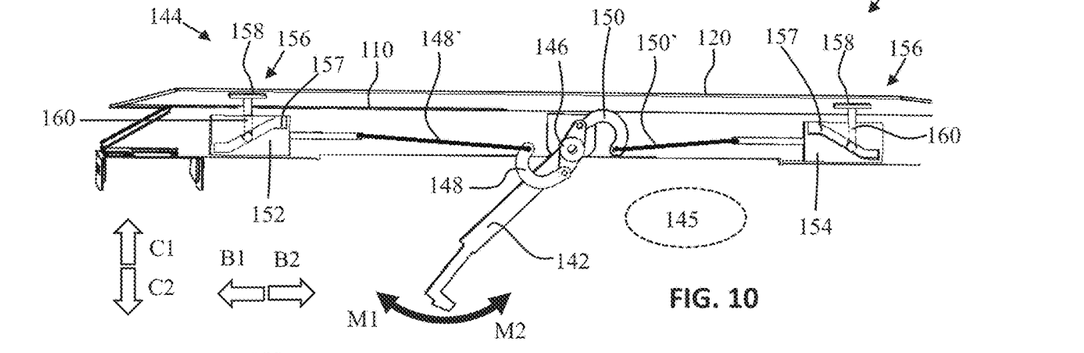
FIG. 10 is a side view showing the lifting mechanism.
Figure 11:
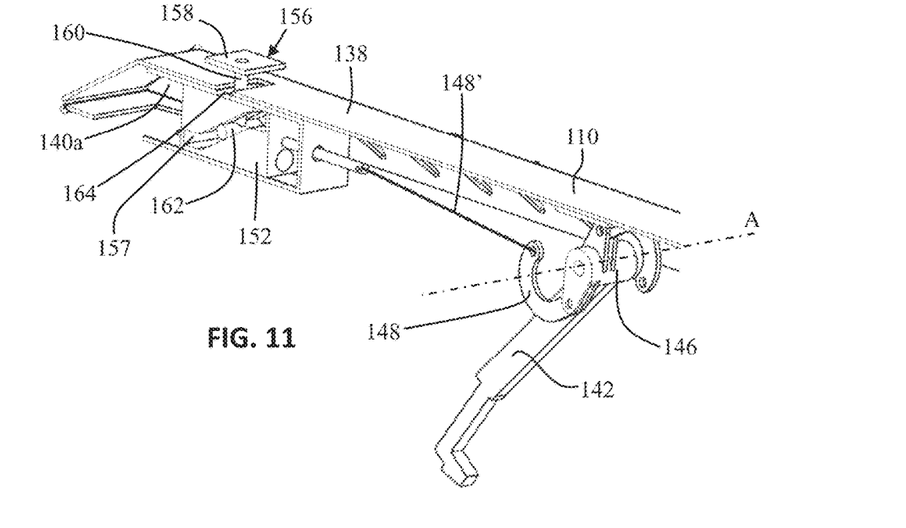
FIG. 11 is a partial perspective view showing the lifting mechanism.

With additional reference to FIGS. 10 and 11, the lifting mechanism 136 may be attached to or supported on, by, or at one the frame 100. More specifically, the lifting mechanism 136 may be attached to or supported on, by, or at one or more of the third or roof supports 110 of the frame. Even more specifically, the lifting mechanism 136 may be at least partially supported within the walls defining one of the roof supports 110. Even more specifically yet, one or more of the roof supports 110 may have C or U-shaped cross section, defined by a top wall 138, two opposing side walls 140a, and having an at least partially open bottom. In some configurations, the at least partially open bottom may be covered by another panel or element or the roof support 110 have an enclosed box structure to secure the lifting mechanism from potential damage and/or to achieve an enclosed clean look.

The lifting mechanism 136 may comprise an actuator 142. The actuator 142 may be connected to one or more lifting parts 144. The actuator 142 may be a handle. The lifting mechanism 136 may include one or more elements between the actuator 142 and the one or more lifting parts 144. For example, the lifting mechanism 136 may include on or more cams, links, bars, cables, screws, springs. The lifting mechanism 136 may include a rotary part 146 and one or more links 148, 148' and 150, 150'.

The actuator or handle 142 may be moved, pivoted, rotated, or otherwise repositioned in a movement direction. Movement direction may be a linear movement, a rotational movement, a pivoting movement, or a combination thereof. The movement between directions M1 and M2 may be accomplished manually (i.e., by an operator directly or indirectly moving the handle 142), mechanically, electro-mechanically, automatically, etc. via a motor, actuator, piston-cylinder, etc. An electro-mechanical assembly, which may include one or more motors, actuators, piston-cylinder assemblies, etc. is illustrated schematically at 145. The movement direction M1, M2 in FIG. 10 is a rotational or pivoting movement. The movement direction M1, M2 may be clockwise and counterclockwise.

The actuator 142 is connected to the rotary part 146. The rotary part 146 may be a bell crank. Movement of the actuator 142 in direction M1, M2 causes the rotary part 146 to move, rotate, or pivot in the same direction M1, M2 or a similar direction. The actuator 142 and the rotary part 146 may pivot or rotate about axis A. Axis A may extend in a cross-car direction, for example. However, the mechanism 136 may be rotated or repositioned such that the axis A extends in a fore-aft direction, or in an angled direction between cross-car and fore-aft.

Referring to FIG. 10, movement of the rotary part 146 causes the one or more links 148, 148' to move. That is, movement of the actuator 142 and rotary part 146 in the M1 direction (clockwise), will cause the links 148, 148' to move in the B1 direction. Movement of the actuator 142 and rotary part 146 in the M2 direction (counter clockwise), will cause the links 148, 148' to move in the B2 direction.

With continued reference to FIG. 10, movement of the actuator 142 and rotary part 146 in the M1 direction (clockwise), will cause the links 150, 150' to move in the B2 direction. Movement of the actuator 142 and rotary part 146 in the M2 direction (counter clockwise), will cause the links 150, 150' to move in the B1 direction.

The links 148, 148' and 150, 150' may be connected to a respective track 152, 154. A track 152, 154 may be a moveable member that comprises a sloped or included slot 157 into which a connecting member 162 described further below is received. Movement of the links 148, 148' and 150, 150' causes the respective track 152, 154 to move. For example, movement of the links 148, 148' in the B1 direction, will cause the track 152 to move in the B1 direction. Movement of the links 148, 148' in the B2 direction, will cause the track 152 to move in the B2 direction. Movement of the links 150, 150' in the B1 direction, will cause the track 154 to move in the B1 direction. Movement of the links 150, 150' in the B2 direction, will cause the track 154 to move in the B2 direction.

The lifting mechanism 136 comprises a lifter 156. Each lifter 156 comprises a lifting portion 158, a shaft 160 connected to the lifting portion 158, and a connecting member 162 connecting the shaft 160 to each slot 157 of the track 152, 154. The shaft 160 and the lifting portion 158 extend through an opening 164 defined in the top wall 138 of the roof support 110. Movement of the track 152, 154, causes the lifter 156 to move up and down in the C1 and C2 directions, respectively. For example, movement of the track 152 in the left direction B1, moves or pushes the connecting member 162, shaft 160, and lifting portion 158 in an up direction C1. Movement of the track 152 in the right direction B2, moves or pulls the connecting member 162, shaft 160, and lifting portion 158 in a downwards direction C2. Movement of the track 154 in the left direction B1, moves or pulls the connecting member 162, shaft 160, and lifting portion 158 in a downwards direction C2. Movement of the track 154 in the right direction B2, moves or pushes the connecting member 162, shaft 160, and lifting portion 158 in an upwards direction C1.

The lifting portion 158 may be attached or fixed to the top panel 120. The lifting mechanism 158 may be permanently attached to the top panel 120 (via welding, bolts, screws, etc. The lifting mechanism 158 may fit into a pocket or slot of the top panel 120, which may allow for the top panel to be easily removed from the apparatus, as desired. When the lifter 156 is moved in the up C1 direction, the lifting portion 158 push or move the top panel 120 in the up direction C1. When the lifter 156 is moved in the down C2 direction, the lifting portion 158 draws or pulls the top panel 120 in the down direction C1. Alternatively, when the lifter 156 is moved in the down C2 direction, the top panel 120 may move in the down direction C1 on its own, due to gravity.

The lifting mechanism 136 allows the top panel 120 to be moved in an up and down direction C1, C2. The top or roof panel 120 may be moved between an upper position and a lower position. Referring back to FIG. 1, when the apparatus 100 is installed on the vehicle 10 and the panels 112 are attached to the frame 102, the top panel 120 should be first removed or at least partially raised from the lower position to the upper position via the lifting mechanism 136 before the side panels 114a,b and quarter panels 116a,b can be removed. This is because the top panel 120 overlaps, hangs over, or shingles over the side panels 114a,b and quarter panels 116a,b. Sec for example, FIGS. 6A, 6B, where the top panel 120 is in the lowered position and overlaps or over hangs or shingles over the lip 130 of the side panels 114a,b and quarter panels 116a,b. After the panels 112 are removed, the roof panel 120 may be lowered back down into the lowered position or onto the frame 102 via the lifting mechanism 136

Referring back to FIGS. 8 and 9, because the rear panel 118 at least partially overlaps or overhangs the top panel 120 (i.e., the rear panel 118 overlaps the drain channel 132, the rear panel 118 may be removed before the top panel 120 is removed or raised via the lifting mechanism 136. Otherwise, the top panel 120 may be jammed. However, in some configurations, the height or distance that the top panel 120 must be moved in an up direction to clear the lip 130 of the side panels 114a,b and/or quarter panels 116a,b may be less than the distance defined between the walls of the drain channel 132 and the rear panel 118, which would allow the top panel 120 to be moved in an up direction, while the rear panel 118 remains attached.

Figure 12:
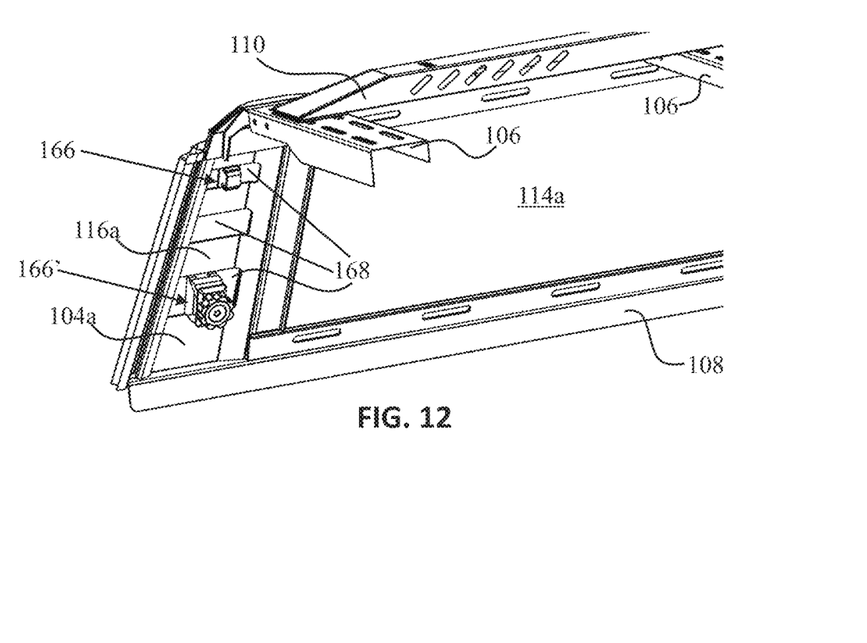
FIG. 12 is a partial perspective view showing the securing mechanism engaging the frame to connect a panel to the frame.

FIG. 12 shows a section of the apparatus 100, when viewed from the inside. The side panel 114a and quarter panels 116a are attached to the frame or pillar 104a. FIG. 9 also shows elements of the frame 102, discussed above. The apparatus comprises one or more securing mechanisms 166, 166' for attaching or securing the panels 112 to the frame 102.

Figure 13:
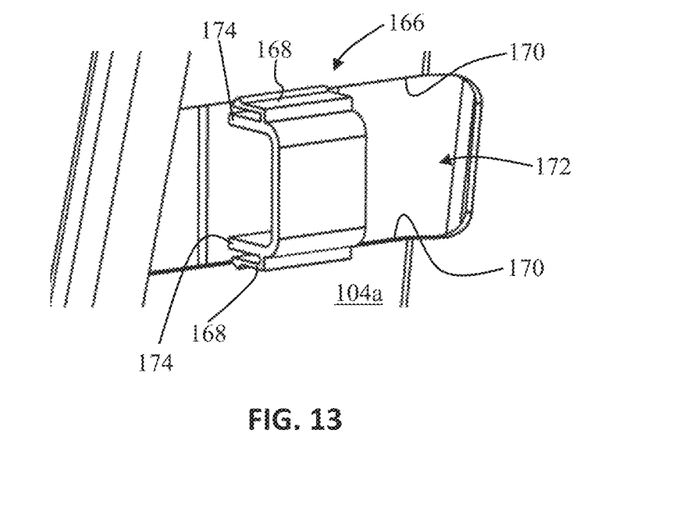
FIG. 13 is a perspective view showing the securing mechanism engaging the frame to connect a panel to the frame.

The securing mechanism 166 in FIG. 13 may extend from a back or B-side of the panel 116a. The securing mechanism 166 may have one or more securing legs 174 for attaching or connecting the securing mechanism 166 to the back side of the panel 112.

The securing mechanism 166 comprises one or more flexible or resilient legs 168 (two illustrated) that function to engage an edge 170 of an opening 172 defined in the frame or pillar 104a. The legs 168 are flexible or resilient and are configured to flex or bend as the securing mechanism 166 is inserted into the opening 172 from the outside of the apparatus 100 to the inside. The legs 168 may bend or compress while passing through the opening and then spring outwardly or un compress after the legs pass through the opening 172 to secure or attach the panel 112 to the frame 12.

To remove the panel 112 from the frame 102, a user may press, bend, or compress the legs 168 downwardly to allow the securing mechanism 166 to pass or fit through the opening 168 and to allow removal of the securing mechanism 166 and separation of the panel 112 from the frame.

Figure 14:
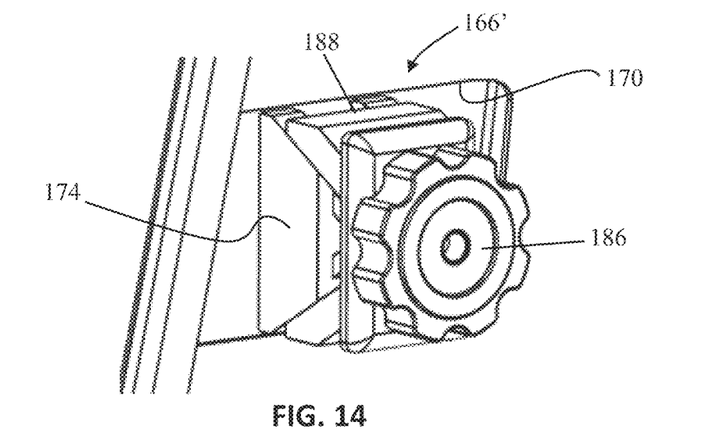
FIG. 14 is a perspective view showing the securing mechanism engaging the frame to connect a panel to the frame.
Figure 15:
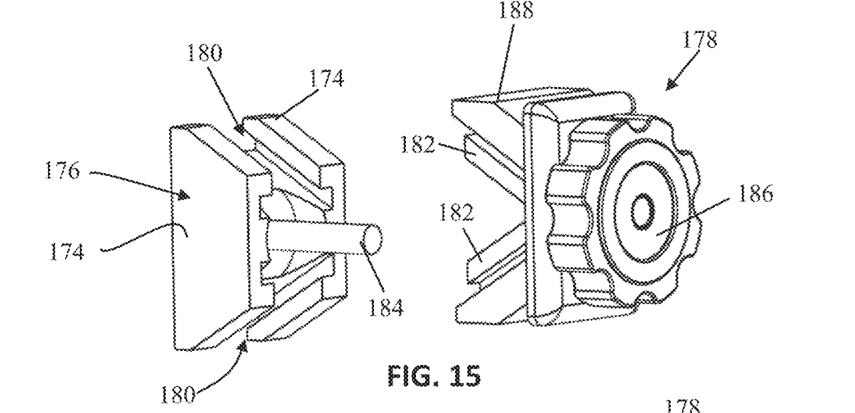
FIG. 15 is an exploded view of the securing mechanism of FIG. 14.
Figure 16:
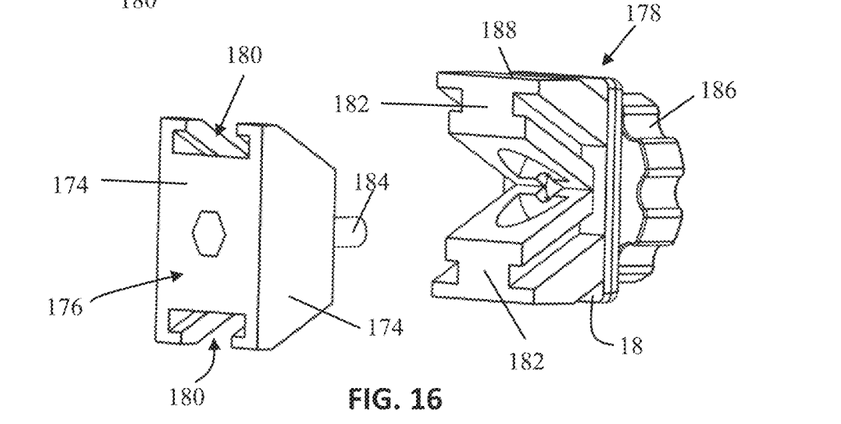
FIG. 16 is an exploded view of the securing mechanism of FIG. 14.

Another securing mechanism 166' is illustrated at FIGS. 14-16. Like the securing mechanism 166 illustrated in FIG. 13 and described above, the securing mechanism 166' of FIGS. 14-16 is also configured to attach a panel 112 to the frame 112 via an opening 164.

The securing mechanism 166' extends from a back or B-side of the panel 116a. The securing mechanism 166' may have a securing leg 174 for attaching or connecting a first portion 176 of the securing mechanism 166 to the back side of the panel 112. The securing mechanism 166' has a second portion 178 that mates with the first portion to secure or attach the panel 112 to the frame 102.

The first portion 176 has a pair of opposing grooves 180 arranged at an angle or on a ramp that are configured to mate with corresponding projections 182 arranged at an angle or on a ramp on the second portion 178.

The first portion 176 has a threaded member 184 that is configured to mate with a corresponding tightening member 186 on the second portion 178.

To attach a panel 112 to the frame 102 using the securing mechanism 166', the first portion 176 of the securing mechanism 166' is inserted or passed through the opening 168 defined in the frame 102 in an orientation such that the threaded member 184 extends into the apparatus 102.

The second portion 176 may then be brought into engagement with the first portion such that the tightening member 186 threads onto the threaded member 184. As the tightening member 186 is rotated, the projections 182 on the second portion 178 engage the grooves 180 on the first portion 176. This allows the two portions 176, 178 to join together. As the tightening member 186 is further tightened, the two portions are brought closer together as the projections 182 further engage into the grooves 180 until the wedge 188 on the first portion 176 and/or the contacts or engages or becomes wedged against the walls or edges defining the opening 172.

The vehicle may be any vehicle. The vehicle may have a cargo area or bed. The cargo area may be any area or portion of a vehicle that may be used for storing and/or transporting goods or cargo. The cargo area may be any part of the vehicle that has an open top. The cargo area or open top can be at least partially closed or covered by a cover, such as a tonneau cover. The cargo area or open top can be at least partially closed or covered by the apparatus according to these teachings. The cargo area or open top can be at least partially closed or covered by the apparatus according to these teachings with or without a tonneau cover covering the cargo area.

The cargo area may be a cargo box, bed, trunk, storage compartment, or a combination thereof. The cargo area may be located in a front portion of a vehicle, a middle portion of a vehicle, and/or at a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by the vehicle. The cargo area may be part of a pickup truck. The cargo area may be part of an all-terrain vehicle or a utility task vehicle or utility terrain vehicle (UTV).

One or more of the features or elements of the apparatus disclosed and/or illustrated herein may be provided or combined with any suitable cover or apparatus, even though the combination or integration is not illustrated or expressly disclosed herein. Moreover, one or more elements or features of the apparatus disclosed herein may be moved or repositioned into other areas or features of the apparatus without departing from the spirt of this application. One or more features or elements of the apparatus disclosed and/or illustrated herein may be duplicated. One or more features or elements of the apparatus disclosed and/or illustrated herein may be removed or eliminated. One or more features or elements of the apparatus disclosed and/or illustrated herein may be rearranged into other areas or positions of the apparatus depending on various construction of the vehicle and/or cargo area.

The apparatus according to these teachings may be referred to as a cap, a truck cap, a topper, a cover, a rack, an overland rack, an overhead rack, a utility rack, a carrier, a tent, or a combination thereof. The apparatus may be used to at least partially cover the open end of a cargo area of a vehicle.

The apparatus may be modular and/or customizable. This means that the apparatus can be customized according to the needs and/or desires of a user or owner. For example, one or more panels of the apparatus can be removed from the frame. For example, one or more panels of the apparatus can be attached or secured to the frame. This flexibility advantageously allows a user to customize the look and functionality of the apparatus on their vehicle. For example, if carrying or transporting a large article or goods in the cargo area (i.e., a ladder, lumber, surf board, etc.), a user may wish to remove one or more panels to allow the article or good to project from or through the apparatus. For example, a user may wish to remove one or more panels from the frame to mount or attach one or more items to the frame (i.e., gas can, vehicle jack, ladder, etc.). For example, a user may wish to attach one or more or all panels to the frame, to restrict or prevent dirt, debris, and/or fluids from entering the cargo area and/or prevent theft of goods inside of the cargo area. Moreover, a user may remove one or more pillars or supports from the frame.

The modularity of the apparatus may also have advantageous benefits regarding shipping or transport and storage. For example, traditional truck caps comprise a single construction body or shell that is heavy, bulky, and takes up a large foot print in a storage building or garage. On the other hand, by having ability to disassemble the panels from the frame and remove pillars and/or supports from the frame, the apparatus according to these teachings can be shipped in one or more boxes. Moreover, a user can take the frame and panels apart and store the contents on a shelf. Furthermore, the modularity of this apparatus may allow dealers to offer just the frame for sale, or one or more panels with the frame, rather than the entire apparatus. This may allow users to customize and purchase only the parts they desire.

The apparatus comprises one or more frames. The frame may function to provide the skeleton of the apparatus onto which one or more panels can be installed. The frame may function to carry the load of the panels and/or any items attached to the apparatus.

The frame may comprise one or more elements, which may be referred to as pillars, supports. The one or more elements may be one or more beams, posts, The frame may be a shell or rack or skeleton, onto which one or more panels, accessories can be mounted to or attached.

The frame may include on or more pillars. A pillar may be an upright component of the frame. The one or more pillars may be a generally vertical element or support component of the frame that extends from the bottom to the top of the frame. The one or more pillars may be an angled element or support component of the frame that extends from the bottom to top of the frame. The one or more pillars may be located on the driver side of the vehicle or cargo area, the passenger side of the vehicle or cargo area, the front wall of the cargo area, the tailgate, or a combination thereof. In some configurations, additional supports may extend between adjacent pillars.

The frame may include on or more support. A support may be a generally horizontal element that extends in a cross-car direction (between driver and passenger side). A support may be a generally horizontal element that extends in a fore-aft direction (front to back). A support may extend between or connect one or more other supports, pillars, or other members of the frame. The one or more pillars and/or supports may form a roof of the apparatus, the side walls of the apparatus, the rear of the apparatus, the bottom of the apparatus, or a combination thereof. The one or more supports, pillars, or elements may increase stability of the apparatus, provide for additional mounting points for attaching one or more panels or accessories to the frame, or a combination thereof.

While pillars are used to describe a vertical component of the apparatus and supports are used to describe a horizontal component of the apparatus, pillar and support may be used interchangeably. Moreover, one or more of the pillars and supports may be arranged at an angle between adjacent pillars and supports, to increase stability of the apparatus and/or to provide additional mounting points for panels, accessories, etc.

The one or more pillars, supports, or element of the frame or apparatus may be made from a suitable material, such as aluminum, steel, plastic, composite, polypropylene, nylon, or other strong and lightweight materials. The one or more pillars, supports, or elements may be connected or secured to each other via one or more permanent attachment means (welding) or one or more non-permanent attachment means (bolts, screws, quick connect fasteners, snaps, pins, clips, prongs, magnets, etc.).

The apparatus may include one or more lifting mechanisms. The lifting mechanism may be operated manually, electromechanically, or both. The lifting mechanism may function move, raise, lower, or otherwise reposition the top or roof panel relative to the other panels, frame, or vehicle. In some configurations, the lifting mechanism may be operable to move one or more other panels like the side panel, front panel, quarter panel, rear panel etc.

The lifting mechanism may include one or more gears, springs, ratchets, cranks, bell cranks, motors, links, cables, fasteners, springs, coils, magnets, sensors, screws, actuators. The lifting mechanism may also be referred to as a lowering mechanism, when functioning to lower the top panel into the closed position, where any gaps are closed between the top panel and the side, front, rear, and/or quarter panels.

The lifting mechanism may include a pinch sensor, to prevent the top panel from closing onto the apparatus if an obstruction is detected between the roof panel and the lower panel or frame. The lifting mechanism may include a force sensor, to prevent the top panel from lifting if a load or weight is acting on the roof panel, which may damage the lifting mechanism or roof panel if allowed to lift.

One or more securing mechanisms may be used for connecting one or more panels to one another, to the frame or elements of the frame, to the wall of the cargo area or vehicle or a combination thereof. The one or more securing mechanisms may be one or more screws, bolts, fingers, pliable, biasable or flexible fingers, legs, or wings, magnets, hook and loop fasteners, slots, prongs, clips, undercut regions, or a combination thereof.

The invention claimed is:

1. An apparatus for covering at least a portion of a cargo area of a vehicle, the cargo area comprises a pair of opposing side walls that include a first side wall and a second side wall, the apparatus comprising:
   a frame structure comprising:

i. a first lower support configured to be attached to the first side wall,
ii. a second lower support configured to be attached to the second side wall,
iii. a forward first pillar extending upwardly from a forward end of the first lower support,
iv. a rear first pillar extending upwardly from a rear end of the first lower support,
v. a forward second pillar extending upwardly from a forward end of the second lower support,
vi. a rear second pillar extending upwardly from a rear end of the second lower support,
vii. a first upper support connecting the forward first pillar and the rear first pillar,
viii. a second upper support connecting the forward second pillar and the rear second pillar;
one or more panels comprising one or more fasteners extending from a back or B-side of the one or more panels;
wherein the frame structure comprises one or more openings and the one or more fasteners are configured to extend into and through the one or more openings and into the frame structure to attach the one or more panels to the frame structure; and
wherein the one or more fasteners comprise a first portion and a second portion, the first portion having a pair of opposing grooves that are arranged at an angle or on a ramp and are configured to mate with a pair of corresponding projections arranged at an angle or on a ramp on the second portion.

2. The apparatus according to claim 1, wherein the first portion has a threaded member that is configured to mate with a corresponding tightening member on the second portion.

3. The apparatus according to claim 1, wherein the one or more fasteners comprise one or more flexible or resilient legs configured to engage and at least partially extend through the one or more openings.

4. The apparatus according to claim 1, wherein the one or more fasteners comprise one or more flexible or resilient legs that are configured to compress while passing through the one or more openings and then uncompress after the one or more legs pass through the one or more openings.

5. The apparatus according to claim 1, wherein the one or more fasteners are disengaged from the frame structure from inside the frame structure.

6. The apparatus according to claim 1, wherein the one or more panels comprise a roof panel comprising a drain channel.

7. The apparatus according to claim 6, wherein the drain channel extends in a cross-car direction.

8. The apparatus according to claim 7, wherein the one or more panels comprise a rear panel, wherein the rear panel at least partially overlaps or overhangs the drain channel after the rear panel is attached.

9. The apparatus according to claim 8, wherein the drain channel is configured to direct fluid and/or debris in the cross-car direction and then downwardly along a path or region between or along a side panel and the rear panel.

10. The apparatus according to claim 9, wherein the one or more panels comprise a first panel having a lip and a second panel, wherein the lip of the first panel is covered by the second panel after the first panel and the second panel are attached to the frame structure.

11. The apparatus according to claim 1, wherein the frame structure comprises a front lower support having a downwardly turned flange that is configured to be attached to a front wall of the cargo area, wherein the front lower support extends between and connects the first lower support and the second lower support.

12. The apparatus according to claim 1, wherein the frame structure comprises one or more pillar bars and one or more support bars, wherein the one or more pillar bars extend in a generally vertical direction and the one or more support bars extend in a generally horizontal direction.

13. The apparatus according to claim 1, wherein the frame structure comprises one or more pillar bars and one or more support bars, wherein the one or more pillar bars extend in a generally vertical direction and the one or more support bars extend in a generally horizontal direction, and wherein the frame structure and/or one or more members of the frame structure are made from aluminum or steel.

* * * * *